No. 696,702. Patented Apr. 1, 1902.
G. G. WEITZ.
ELECTRIC HOSE COUPLING.
(Application filed Jan. 24, 1902.)
(No Model.)
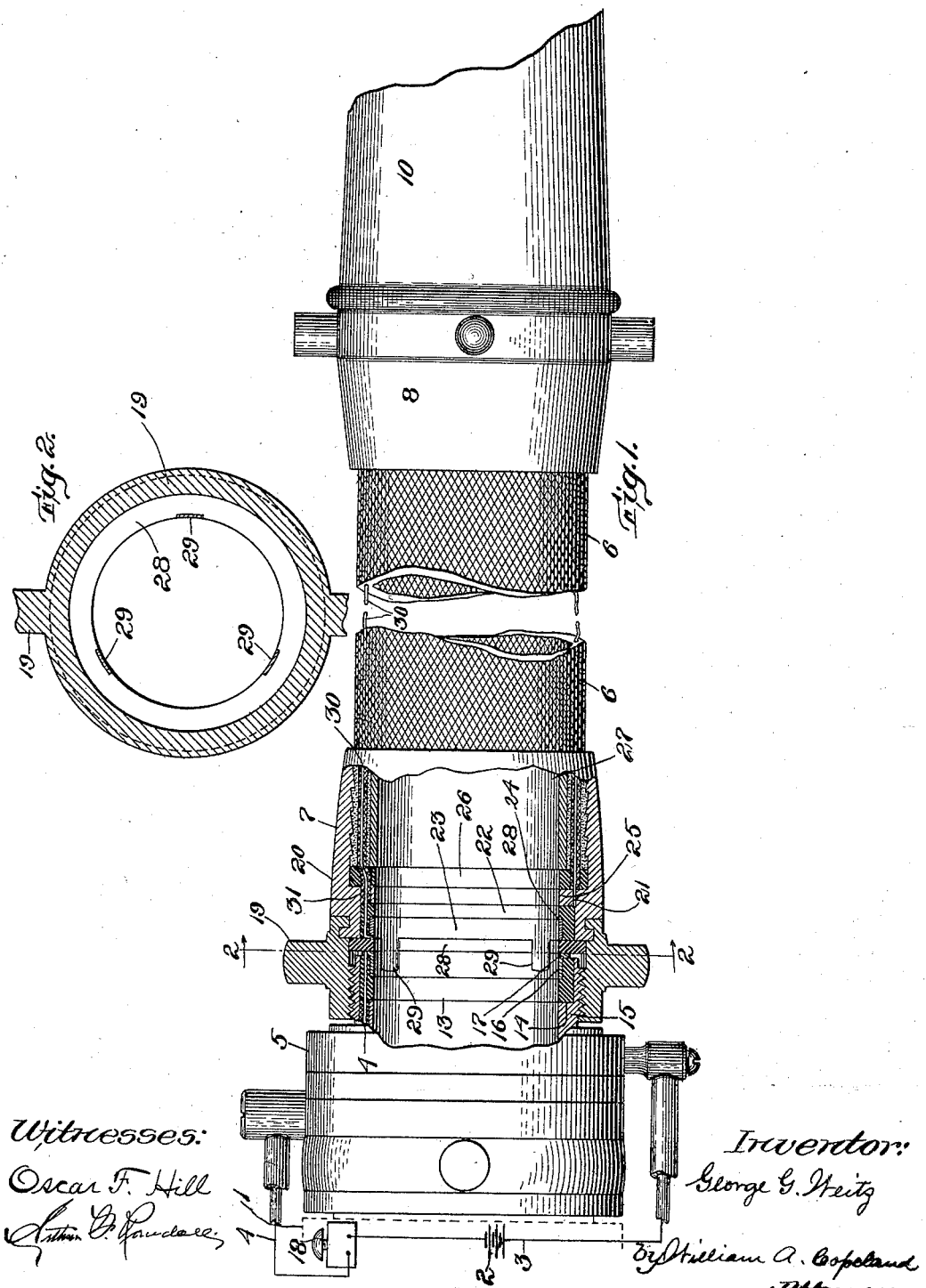

UNITED STATES PATENT OFFICE.

GEORGE G. WEITZ, OF MEDFORD, MASSACHUSETTS, ASSIGNOR TO HIMSELF, FRANKLIN K. YOUNG AND MICHAEL P. CURRAN, TRUSTEES, OF BOSTON, MASSACHUSETTS.

ELECTRIC-HOSE COUPLING.

SPECIFICATION forming part of Letters Patent No. 696,702, dated April 1, 1902.

Application filed January 24, 1902. Serial No. 91,128. (No model.)

*To all whom it may concern:*

Be it known that I, GEORGE G. WEITZ, a citizen of the United States, and a resident of Medford, in the county of Middlesex and State of Massachusetts, have invented certain new and useful Improvements in Electric-Hose Couplings, of which the following is a specification.

This invention relates to an electric hose-signaling system, and has for its object an improved coupling for connecting one section of hose with another section or for connecting the hose either with the engine-coupling or with the nozzle in such manner as to make electrical contact.

The invention will now be fully described by reference to the accompanying drawings and the novel features thereof will be particularly pointed out in the claims at the close of this specification.

In the drawings, Figure 1 is a side elevation of a line of hose, partly broken away, and connected couplings, partly in section, illustrating the invention. Fig. 2 is a section on line 2 2 of Fig. 1.

Referring now to the drawings, 1 represents a fire-engine; 2, the battery; 3, the ground-wire; 4, the positive wire, and 5 the engine-coupling.

6 represents a section of hose having on one end a female coupling 7 embodying my invention, which connects the hose with the male end of the engine-coupling 5, and having on the other end a male coupling 8, which connects the hose with the female thread on the nozzle 10.

Within the circuit at the engine, as at 11, is a bell 18, which is operated by a circuit-closer at the nozzle end of the line. Set inside the outer end of the male coupling 5 is an insulating-ring 13, which butts up against the shoulder 14 inside the shell 15 and extends out to the end of the shell. Set inside the outer end of insulating-ring 13 is a contact-ring 16, so fitted that when the parts are assembled the inside of the coupling will furnish a smooth waterway. The contact-ring 16 is formed with a flange 17, which laps onto the end of insulating-ring 13, but not extending entirely over it, as the ring 16 must not contact with shell 15. The wire 4 is connected with contact-ring 16 and leads back through an insulated passage in the coupling 5 to the bell 18.

The female hose-coupling 7 is formed with a swivel 19, internally threaded to connect it with the male coupling. The swivel 19 turns on the shell 20, which is attached to the hose. Set inside the shell 20 and butting up against the shoulder 21, formed by the flange 25, is a ring 22, of insulating material, preferably vulcanized rubber. The outer end of the insulating-ring 22 is formed with an enlarged interior diameter to receive a contact-ring 23, which butts against a shoulder 24 on the insulating-ring 22.

On the inner end of the flange 25 is a gasket 26, of non-conducting material, preferably rubber, against which the end of the hose butts, said gasket serving not only as a gasket, but as an insulator for the metal expansion-ring 27, which is normally employed to secure the hose to the shell 20.

On the outer ends of shell 20, insulating-ring 22, and contact-ring 23, which together form a shoulder within the swivel 19, rests a gasket 28, of non-conducting material, preferably rubber.

Projecting longitudinally outward from the contact-ring 23 are one or more contact-fingers 29, preferably three in number and preferably being elastic. Wire 30, which is to make electrical connection with wire 4, passes through the gasket 26, flange 25, and insulating-ring 22 and is electrically connected with the contact-ring 23, the wire being insulated in its passage to said contact-ring either by the usual insulating-wrapping or preferably also for additional security an insulating-tube 31 being provided. When the female coupling 7 is connected with the male coupling, the fingers 29 will make contact with the ring 16 in the end of the male coupling, thus making electrical connection between the wire 5 and the wire 30. After the wire 30 passes through the flange 25 it preferably is laid around in a groove in said flange and then through a hole in the gasket 26, and thence on through the hose 6 to the male coupling at the other end. The gasket clamps the wire to its seat in the flange, so as to prevent the wire from being pulled away from the contact-ring 23, which might accidentally occur if the wire were carried directly back without the winding.

What I claim is—

1. A female member of a coupling for electric hose having a shell with an interior flange, an insulating-ring within said shell and butting against the flange of said shell, a contact-ring set in said insulating-ring and insulated thereby from the shell, said contact-ring having one or more contact-fingers projecting longitudinally therefrom, substantially as described.

2. A female member of a coupling for electric hose having a shell with an interior flange, a flanged insulating-ring within said shell and butting against the flange of said shell, a contact-ring within the mouth of said insulating-ring and butting against the flange thereof, and insulated from said shell, said contact-ring having one or more contact-fingers projecting longitudinally outward therefrom, the inner periphery of the contact-ring, insulating-ring and said shell-flange forming a flush waterway, and a wire electrically connected with said contact-ring and an insulated passage for said wire through the flange of the shell to the hose, substantially as described.

3. A female member of a coupling for electric hose having a shell with an interior flange, a flanged insulating-ring butting against said flange, a contact-ring in the mouth of said insulating-ring butting against the flange thereof which insulates it from the shell, an insulating-gasket against the outer ends of the contact-ring and the insulating-ring, contact-fingers projecting outward from said contact-ring and a wire electrically connected with said contact-ring and leading rearwardly therefrom through the flange of the shell from which it is insulated and through the hose, substantially as described.

4. A female member of a coupling for electric hose having a shell with an interior flange, a flanged insulating-ring butting against said flange, a contact-ring in the mouth of said insulating-ring butting against the flange thereof and insulated thereby from the shell, an insulating-gasket against the outer ends of the contact-ring and the insulating-ring, contact-fingers projecting from said contact-ring, a wire leading from said contact-ring rearwardly through the flange of the shell and coiled around in a seat in said flange, and insulated from said flange, and a gasket on the rear face of said flange which holds the wire on its seat, the wire leading from the coil through the said gasket and back through the hose, substantially as described.

5. A female member of a coupling for electric hose having a shell with an interior flange, a flanged insulating-ring against said flange, a contact-ring in the mouth of said insulating-ring against the flange thereof and insulated from said shell, an insulating-gasket against the outer ends of said contact-ring, contact-fingers projecting from said contact-ring, a wire connected with said contact-ring and insulated from the shell and leading through the hose, in combination with a male member having a contact-ring with which a wire is connected, said wire and contact-ring being insulated from the body of the shell, said contact-ring making contact with the fingers on the contact-ring of the female coupling when the two members are coupled, substantially as described.

In testimony whereof I have affixed my signature in presence of two witnesses.

GEORGE G. WEITZ.

Witnesses:
WILLIAM A. COPELAND,
ROBERT WALLACE.